(12) United States Patent
Attallah et al.

(10) Patent No.: US 8,205,948 B2
(45) Date of Patent: Jun. 26, 2012

(54) METHOD OF DETERMINING AN INITIAL PRESSURE IN A MOTOR VEHICLE BRAKE SYSTEM

(75) Inventors: Faouzi Attallah, Darmstadt (DE); Rudiger Majlo, Berlin (DE); Guntjof Magel, Russelsheim (DE); Lukas Kroh, Butzbach (DE); Frank Sikorski, Steinbach (DE); Andreas Kohl, Mainz (DE); Jochen Muller, Marburg (DE)

(73) Assignee: Continental Teves AG & Co., OHG, Frankfurt (DE)

(*) Notice: Subject to any disclaimer, the term of this patent is extended or adjusted under 35 U.S.C. 154(b) by 770 days.

(21) Appl. No.: 12/064,969

(22) PCT Filed: Aug. 28, 2006

(86) PCT No.: PCT/EP2006/065734
§ 371 (c)(1),
(2), (4) Date: Feb. 27, 2008

(87) PCT Pub. No.: WO2007/025951

PCT Pub. Date: Mar. 8, 2007

(65) Prior Publication Data
US 2008/0231108 A1 Sep. 25, 2008

(30) Foreign Application Priority Data

Sep. 1, 2005 (DE) .......................... 10 2005 041 556

(51) Int. Cl.
*B60T 13/18* (2006.01)
(52) U.S. Cl. ...................................................... 303/11
(58) Field of Classification Search ................ 303/3, 10, 303/11, 15, 122.05, 122.09, 122.1, 122.12; 702/64, 114, 138, 140, 189, 190, 199; 701/70, 701/78, 83
See application file for complete search history.

(56) References Cited

U.S. PATENT DOCUMENTS

| | | | |
|---|---|---|---|
| 5,632,531 A | | 5/1997 | Batistic et al. |
| 5,927,832 A | * | 7/1999 | Fulks et al. .................. 303/167 |
| 6,123,395 A | | 9/2000 | Wolf et al. |
| 6,132,010 A | * | 10/2000 | Holt et al. ........................ 303/11 |
| 6,308,140 B1 | * | 10/2001 | Dowling et al. ................ 702/60 |
| 6,446,490 B1 | | 9/2002 | Lohner et al. |
| 6,668,634 B1 | | 12/2003 | Zimmermann et al. |
| 7,039,554 B2 | * | 5/2006 | Nguyen et al. ................ 702/183 |

(Continued)

FOREIGN PATENT DOCUMENTS

DE 3819490 12/1989

(Continued)

*Primary Examiner* — Bradley King
*Assistant Examiner* — Nicholas J Lane
(74) *Attorney, Agent, or Firm* — Brinks Hofer Gilson & Lione

(57) ABSTRACT

A method of determining an initial pressure prevailing between a master brake cylinder and an inlet valve of a wheel brake cylinder of a motor vehicle determines the initial pressure taking into consideration the variation of a voltage of a PWMoperated motor of a pump, which is used for the return delivery of brake fluid from a low-pressure accumulator into the master brake cylinder. Several characteristic quantities of the voltage variation are measured and converted to respective initial pressure values. The characteristic quantities or the initial pressure values determined therefrom are filtered or conditioned in the event of lack in quality or reliability of the measured characteristic quantities. The respective initial pressure values of similar size are averaged, and the averaged initial pressure values are temporally averaged in order to dampen fluctuations.

7 Claims, 2 Drawing Sheets

U.S. PATENT DOCUMENTS

| | | | |
|---|---|---|---|
| 2005/0067895 A1* | 3/2005 | Marathe | 303/122.09 |
| 2005/0096873 A1* | 5/2005 | Klein | 702/184 |
| 2006/0145533 A1* | 7/2006 | Braeuer et al. | 303/191 |
| 2006/0202552 A1* | 9/2006 | Magel et al. | 303/142 |

FOREIGN PATENT DOCUMENTS

| | | |
|---|---|---|
| DE | 10359224 | 4/2005 |
| WO | WO 2004043752 A2 * | 5/2004 |
| WO | WO 2005007475 A1 * | 1/2005 |

* cited by examiner

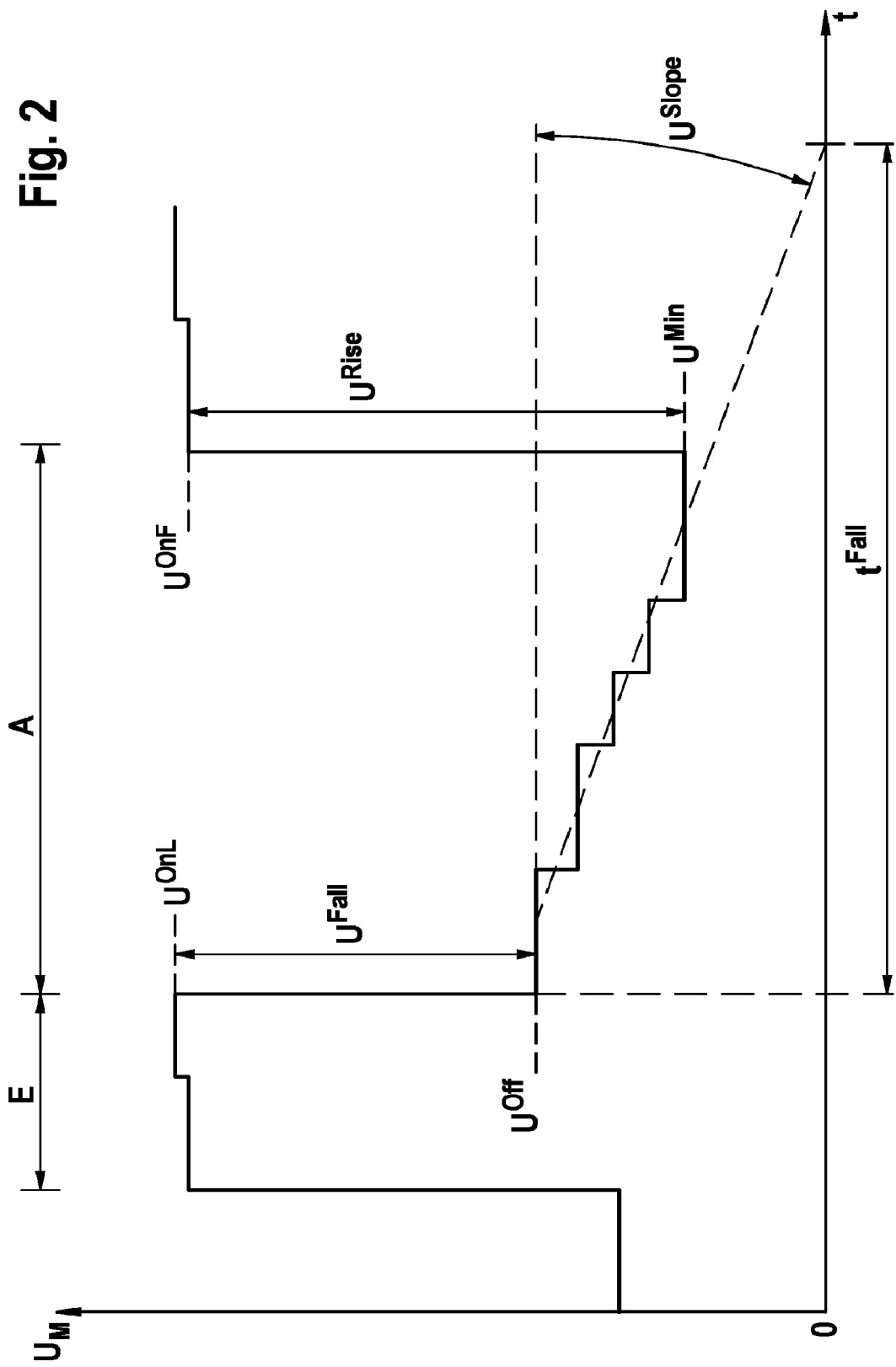

METHOD OF DETERMINING AN INITIAL PRESSURE IN A MOTOR VEHICLE BRAKE SYSTEM

BACKGROUND OF THE INVENTION

The present invention relates to a method of determining an initial pressure in a motor vehicle brake system and a pressure control device for implementing the method.

For the optimal application of electronic brake systems, in particular anti-lock systems (ABS) and driving stability control systems (e.g. ESP), it is favorable to drive—with inlet and outlet valves being respectively associated with a wheel brake cylinder—by taking into account the so-called initial pressure, i.e. the pressure between the master brake cylinder and the inlet valve. It is possible to sense this pressure using a pressure sensor, however, sensors which are appropriate for this purpose are very expensive.

Document DE 199 46 777 A1 discloses a method which, for assessing an initial pressure that prevails between a master brake cylinder and an inlet valve of a wheel brake cylinder of a motor vehicle brake system, uses the follow-up voltage of a clock-operated motor of a pump which is provided for the return delivery of brake fluid from an accumulator chamber arranged on the outlet side of the wheel brake cylinder into the master brake cylinder, as well as using the accumulator chamber pressure determined or measured in the accumulator chamber. The accuracy of the assessed pressure value is not indicated.

The object of the invention is to provide a method which allows determining the initial pressure in an exact, reliable and simple manner.

SUMMARY OF THE INVENTION

The invention achieves this object based on the idea that various characteristic quantities of the voltage variation, which depend to a different degree on the initial pressure to be determined, are determined at the motor of the return pump which is operated in a clocked manner, in particular by pulse-width modulation (PWM). An initial pressure is determined from each of these characteristic quantities based on a functional relation, in particular a linear relation, and using the results of measurements provided for calibration. The influence of errors of measurement, outliers or other brief disturbances in the voltage variation is minimized according to the invention due to the large quantity of the characteristic quantities, due to the evaluation of the measured variables, in particular using additional measuring data such as the filling level of a low-pressure accumulator, and due to the selective filtering, conditioning and averaging of data. This renders it possible to make a well-founded quantitive statement about the initial pressure.

The implementation of the method of the invention obviates the need for pressure sensors, and brake control can be considerably improved in consideration of the initial pressure determined according to the invention. Advantageously, the initial pressure determined according to the invention can also be used to test the operability of an existing pressure sensor. In a case of fault of the pressure sensor, the initial pressure determined according to the invention can substitute the initial pressure which otherwise has been measured by means of the pressure sensor.

Furthermore, the invention comprises an electrohydraulic pressure control device.

The method of the invention can be implemented in electronic brake systems for motor vehicles or in electronic control operations for regulating the driving dynamics of motor vehicles.

Further preferred embodiments of the invention can be found in the subclaims and the following description making reference to Figures.

BRIEF DESCRIPTION OF THE DRAWINGS

In the accompanying drawings:

FIG. 2 is a schematic view of the variation of the motor voltage during an on-off-on cycle of the supply voltage at the motor.

DETAILED DESCRIPTION OF THE DRAWINGS

Figure 1:
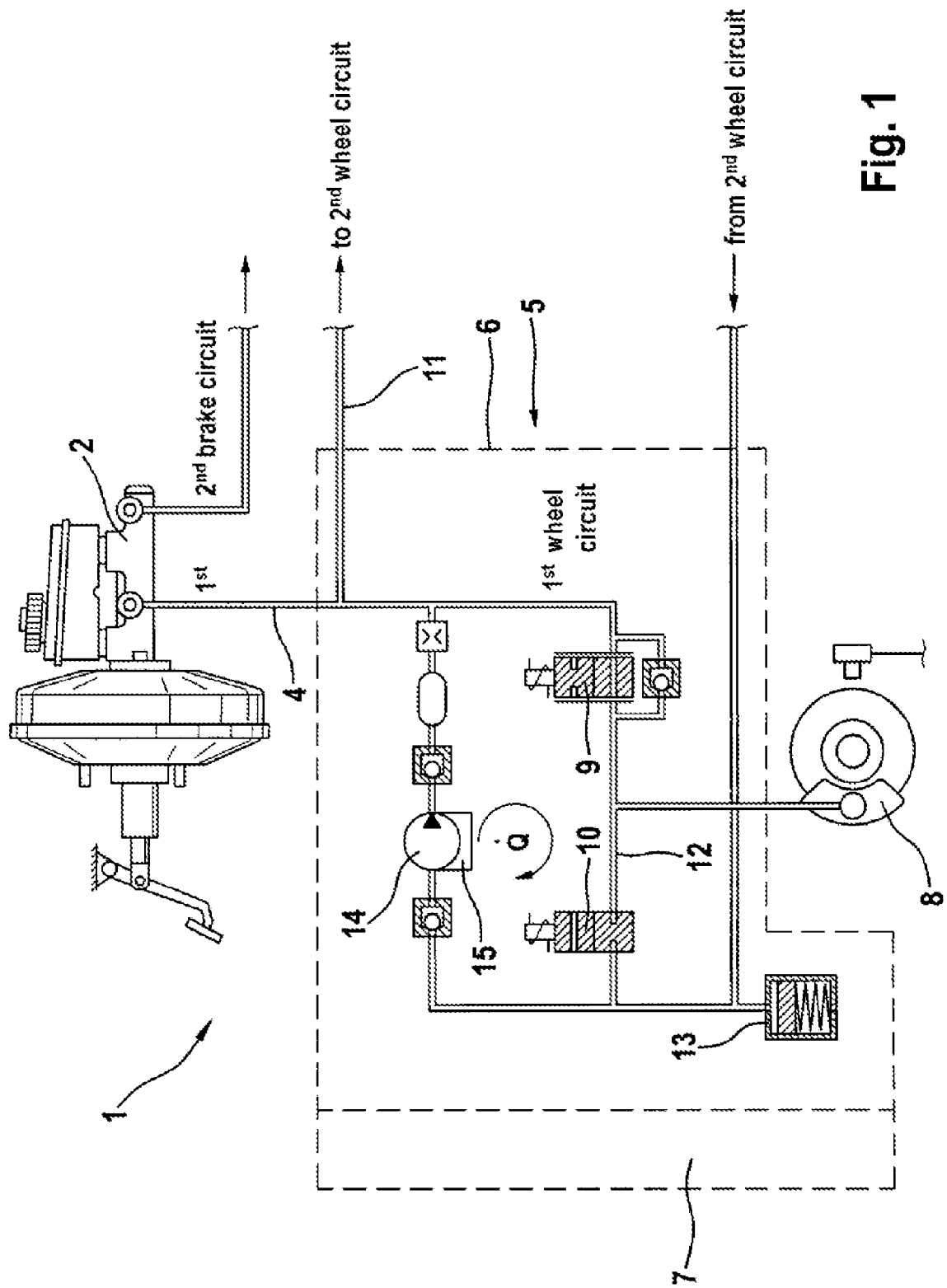
FIG. 1 is a schematic view of a motor vehicle brake system with only one wheel brake circuit illustrated.

FIG. 1 illustrates an example of a brake circuit of a slip-controlled motor vehicle brake system 1, wherein only one wheel brake circuit is illustrated. The brake system 1 comprises a braking device with a master brake cylinder 2, which is connected to a wheel brake 8 by way of a hydraulic connection 4 and a distributor device 5 comprising a hydraulic unit 6 and an electronic unit 7. The hydraulic unit 6 possesses an accommodating body for hydraulic and electrohydraulic components such as electromagnetically operable inlet and outlet valves 9, for each wheel brake 8. In the connection 4, still upstream of a normally open inlet valve 9 for said wheel brake, is a branch 11 to a second wheel brake circuit. Projecting from the wheel brake 8, a return connection 12 leads via the normally closed outlet valve 10 to a low-pressure accumulator 13, which can take up a hydraulic fluid volume discharged from the wheel brake 8 as a result of ABS-control cycles. The-low pressure accumulator 13 feeds a suction side of a motor-driven pump 14. The pump is preferably a radial piston pump and features in each case a suction valve on the suction side and a pressure valve on the pressure side. Motor 15 and pump 14 are preferably designed as an aggregate (motor-pump-aggregate) and allow returning discharged hydraulic fluid in the direction of the master brake cylinder 2. It is understood that the brake system can feature an additional range of functions such as, for example, traction slip control (TCS) or driving stability control (ESP), which requires an electromagnetically controllable and normally open separating valve connected upstream of the inlet valve 9.

During ABS control, a difference in pressure develops at the inlet valve 9 resulting from pressure reduction processes via the outlet valve 10. The volume escaping from the wheel brake 8 enters the low-pressure accumulator 13. At the same time the pump 14 is activated and pumps the discharge volume, against the prevailing initial pressure, back into the direction of the pressure sensor 3 and upstream from the inlet valve 9.

The electric motor 15 of the pump 14 is based in principle on a separately excited d.c. machine, in particular a permanent magnet-excited communicator machine, the speed of which is controlled by way of pulse width modulation (PWM) of a constant supply voltage. A predefined number of speed stages (for example 1 to 12) are possible in this context. For controlling rotational speed, the duration of starting- and shut-off phases of the supply voltage prevailing at the motor is modulated within a fixed interval (one PWM cycle, e.g.

T=60 sec). Full drive of the motor (speed stage 12) corresponds to a prevailing supply voltage (starting phase) over the entire aforementioned interval. When the drive is reduced, the supply voltage of the motor is disabled after a certain time (for example, after 40 ms for speed stage 8), remains shut off for the rest of the PMW cycle (for example, 20 ms for speed stage 8) (shut-off phase) and is not enabled again until commencement of the starting phase of the next PWM cycle. With decreasing drive (speed stage) the pulse width of the starting phase (supply voltage at motor is on) will decrease and the pulse width of the shut-off phase (supply voltage at motor is off) will increase.

FIG. 2 is a schematic representation of the voltage variation at the motor during an on-off-on cycle of the supply voltage of the motor. In the PWM starting phase E the motor voltage roughly corresponds to the maximum available supply voltage. During the PWM shut-off phase A, the motor 15 acts as a generator and a generator voltage can be tapped. FIG. 2 depicts some characteristic quantities of the voltage variation which are relevant for the method of the example: the last voltage value when the supply voltage $U^{OnL}$ is still enabled, the first voltage value when the supply voltage $U^{OnF}$ is enabled again, the first voltage value after the supply voltage $U^{off}$ is disabled, the difference between the last voltage value with the supply voltage still enabled and the first voltage value after the supply voltage $U^{Fall}$ is disabled, the lowest achieved voltage value with the supply voltage $U^{Min}$ disabled, the sum of the voltage values with the supply voltage $U^{Sum}$ disabled, the rise of the voltage drop when the supply voltage $U^{slope}$ is disabled, the difference between the lowest achieved voltage value with the supply voltage disabled and the first voltage value with the supply voltage $U^{Rise}$ being enabled again, time $t^{Fall}$ until the voltage drops to zero.

Based on a functional relation and the results of measurements for calibration, each of these characteristic quantities of the voltage variation can be used to determine a value for the initial pressure. In order to perform a quickest possible assessment which is easy to check and to monitor in the processor of the electronic brake system, a simple linear relation between a parameter U and the initial pressure P is chosen according to the example:

$$P=P_0+P_1\times U$$

In this case, U is one of the characteristic quantities of the voltage variation of the motor as described by way of the example. The parameters $P_0$ and $P_1$ for each characteristic quantity can be obtained from measurements for calibration.

To determine a value for the initial pressure, which is to the least possible extent influenced by errors of measurement, outliers or other brief disturbances in the voltage variation, the following measures are taken by way of example. However, it is also within the context of the invention if only one measure or some measures are taken.

The quality and/or reliability of the measured characteristic quantities, i.e. the voltage variation at the pump motor, is evaluated. Based thereon data is filtered and/or conditioned in case of need. Disturbances in the voltage variation will preferably occur when one or both of the low-pressure accumulators in the brake circuit is/are empty or when the pump is between two speed stages. If the voltage variation is undisturbed and in the absence of any of the two mentioned cases, the characteristic quantities are reliable, and one value each for the initial pressure is determined from them based on the linear relation. If there are disturbances in the signal and/or if any of the two mentioned cases prevails, the characteristic quantities are assessed as unreliable. In this case, the simplest possibility is to maintain the value of the initial pressure which was defined last as reliable until the characteristic values are unreliable. In the case of one or two empty low-pressure accumulators, it is also favorable to use the characteristic quantities for determining an initially pressure although they have been assessed as unreliable. It is preferred in the case of one or two empty low-pressure accumulators to average the results of the two procedures, i.e. the value of the initial pressure which was defined last as reliable and the value of the initial pressure determined from the characteristic values assessed as unreliable are averaged.

The initial pressure values determined from the various characteristic values per PWM cycle are averaged in order to obtain the final initial pressure. If there are no errors of measurement or evaluation and the initial pressures determined from the various characteristic quantities consequently are roughly equal, it is preferred to take into account only pressure values of similar size when averaging more than two pressure values in order to eliminate outliers (averaging operation without extreme values).

This averaging operation can be performed in each case at the end of the PWM cycle when all characteristic quantities are available, i.e. one time per PWM cycle. Preferably, an averaging operation is performed two times per PWM cycle, since the characteristic quantities $U^{OnL}$, $U^{Off}$ and $U^{Fall}$ are available at an earlier time during the PWM cycle, while the other characteristic quantities are available only at the end of the PWM cycle.

To dampen fluctuations, it is furthermore preferred to perform another temporal averaging operation, i.e. the next initial pressure value $P_i'$ is the result of the averaging operation of the initial pressure $P_{i-1}$ determined last with the currently assessed initial pressure $P_i$: $P_i'=(P_{i-1}+P_i)/2$.

The invention claimed is:

1. A method of determining an initial pressure which prevails between a master brake cylinder and an inlet valve of a wheel brake cylinder of a motor vehicle brake system, which determines the initial pressure taking into consideration a variation of a supply voltage during an on-off-on cycle of a PWM-operated motor of a pump for return delivery of brake fluid from a low-pressure accumulator into the master brake cylinder; the method comprising the following steps:

measuring several characteristic quantities of the voltage variation including at least a first and a second characteristic quantity;

determining a first individual initial pressure value from the first characteristic quantity and setting the first individual initial pressure value as a current first individual initial pressure value;

determining a second individual initial pressure value from the second characteristic quantity and setting the second individual initial pressure value as a current second individual initial pressure value;

newly measuring the several characteristic quantities;

determining that at least one of the first and second newly measured characteristic quantities is an outlier if the at least one of the newly measured first and second characteristic quantities was measured while the pump was between two speed stages;

replacing the first individual initial pressure value with a new first individual initial pressure value as a current first individual initial pressure value calculated from the newly measured first characteristic quantity if the newly measured first characteristic quantitative is not an outlier;

maintaining the first individual initial pressure value as the current first individual initial pressure value if the newly measured first characteristic quantity is an outlier because it was measured while the pump was between two speed stages;

replacing the second individual initial pressure value with a new second individual initial pressure value calculated from the newly measured second characteristic quantity if the second characteristic quantitative is not an outlier;

maintaining the second individual initial pressure value as the current second individual initial pressure value if the second characteristic quantity is an outlier because it was measured while the pump was between two speed stages;

averaging the current first and second individual initial pressure values to determine a first averaged initial pressure value;

determining a subsequent first averaged initial pressure value from subsequent current first and second individual initial pressure values;

temporally averaging the subsequent first averaged initial pressure value with at least the previously determined first averaged initial pressure value to determine a second averaged initial pressure value; and generating output information representing the second averaged initial pressure value.

2. The method as claimed in claim 1, wherein the several characteristic quantities of the voltage variation comprise two or more of the following quantities: the last voltage value $U^{OnL}$ when the supply voltage is still enabled, the first voltage value $U^{OnF}$ when the supply voltage is enabled again, the first voltage value $U^{Off}$ after the supply voltage is disabled, the difference $U^{Fall}$ between the last voltage value with the supply voltage still enabled and the first voltage value after the supply voltage is disabled, the lowest achieved voltage value with the supply voltage $U^{min}$ disabled, the sum of the voltage values with the supply voltage $U^{Sum}$ disabled, the slope $U^{Slope}$ of the voltage drop when the supply voltage is disabled, the difference $U^{Rise}$ between the lowest achieved voltage value with the supply voltage disabled and the first voltage value with the supply voltage being enabled again, the time $t^{Fall}$ until the voltage drops to zero.

3. The method as claimed in claim 1, wherein for the first characteristic quantity of the voltage variation, a linear relation defined by a slope and a y-intercept between the first characteristic quantity and the first individual initial pressure value is assumed, and the slope and the y-intercept are obtained from measurements for calibration; and wherein for the second characteristic quantity of the voltage variation, a linear relation defined by a slope and a y-intercept between the second characteristic quantity and the second individual initial pressure value is assumed, and the slope and the y-intercept are obtained from measurements for calibration.

4. The method as claimed in claim 1, comprising the steps of:

determining that at least one of two low-pressure accumulators is empty, determining that at least one of the first and second characteristic quantities is an outlier because the at least one low-pressure accumulator is empty.

5. The method as claimed in claim 4, wherein both the first and second individual initial pressure values are determined from the first and second characteristic quantities.

6. The method as claimed in claim 1, wherein the second averaged initial pressure value is used as a controlled variable for regulating braking interventions.

7. The method as claimed in claim 1, wherein the second averaged initial pressure is used as a comparison value for testing the operability of a pressure sensor.

* * * * *